Figure 9:
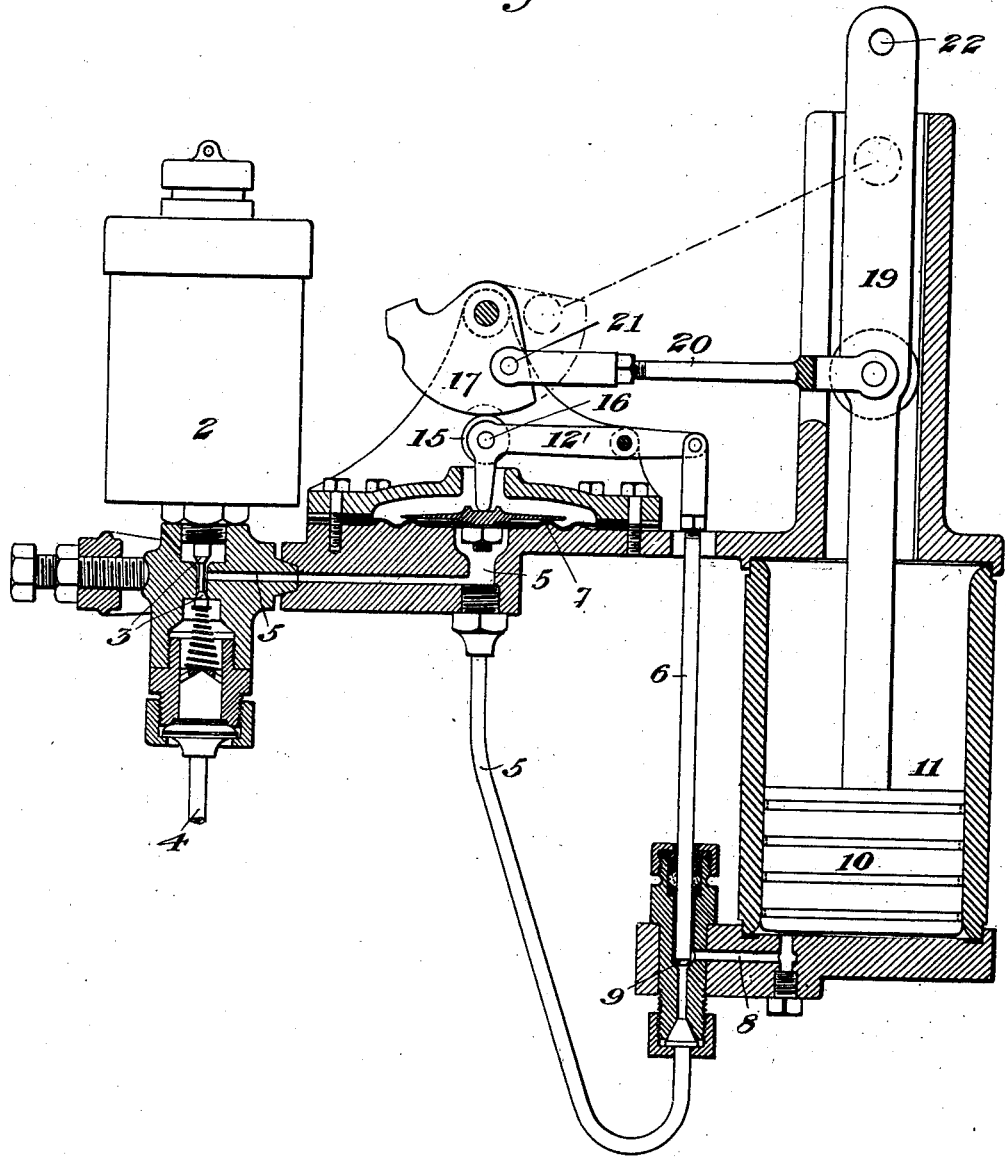

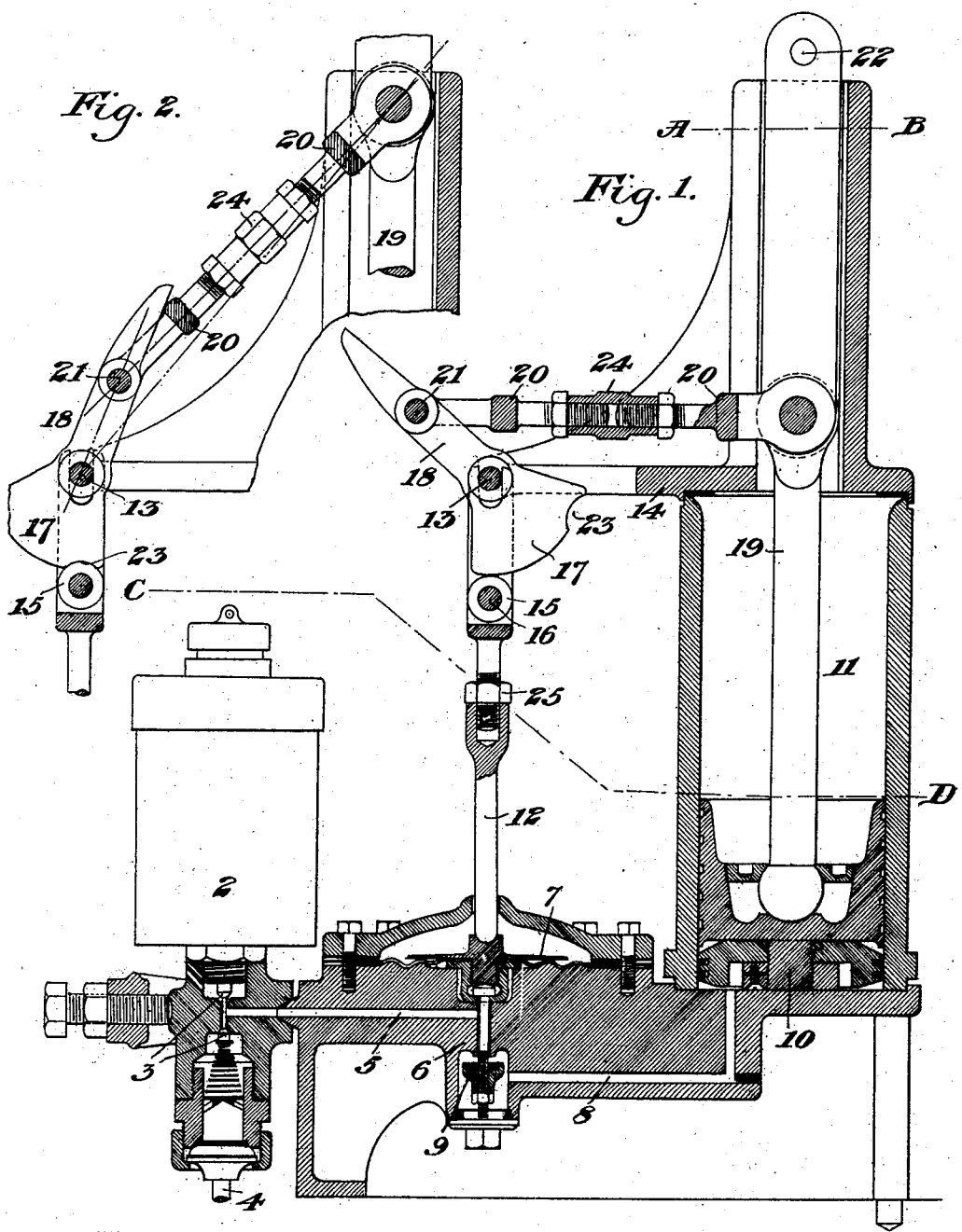

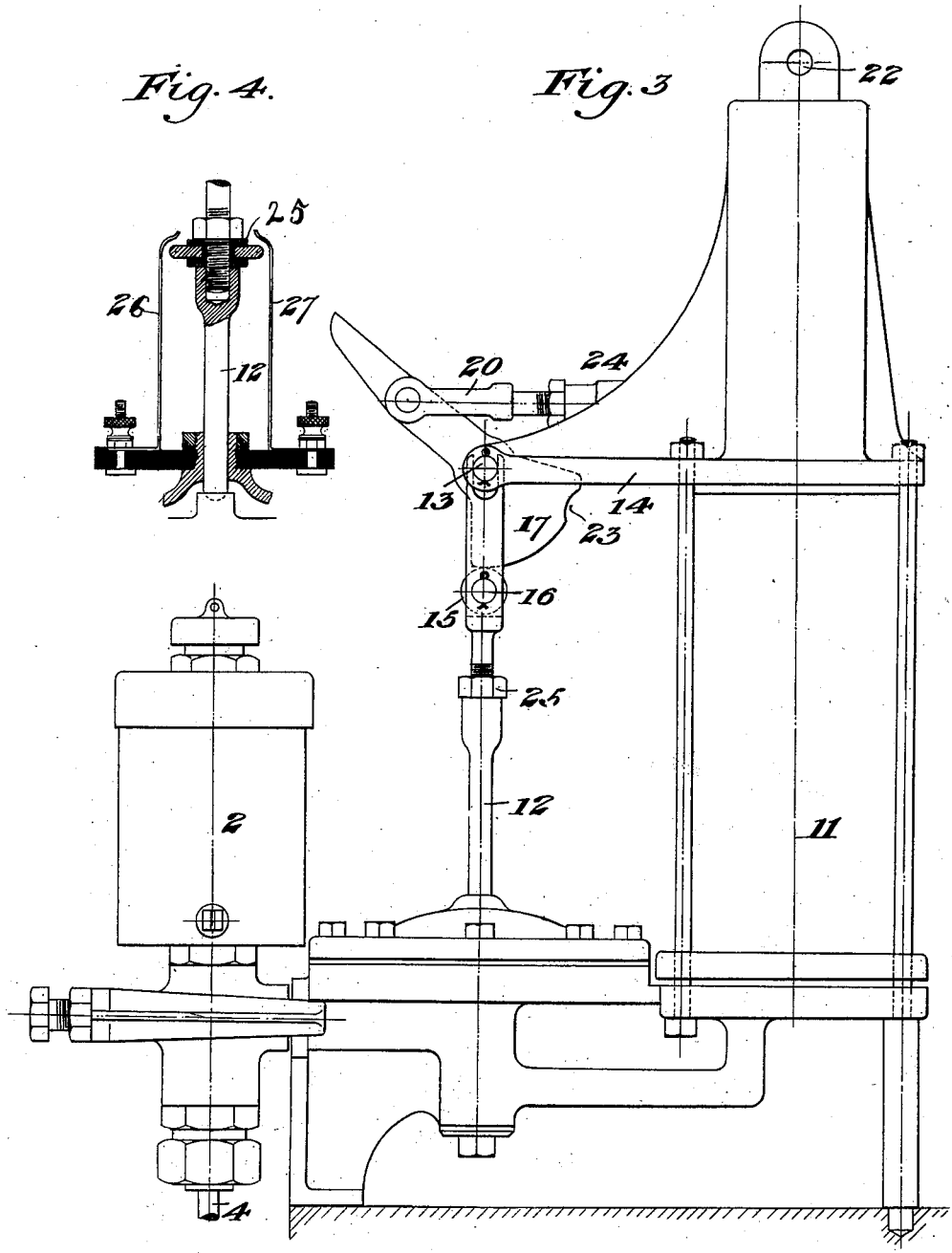

No. 745,307. PATENTED NOV. 24, 1903.
J. P. COLEMAN.
FLUID PRESSURE MECHANISM.
APPLICATION FILED MAY 21, 1902.
NO MODEL. 6 SHEETS—SHEET 3.
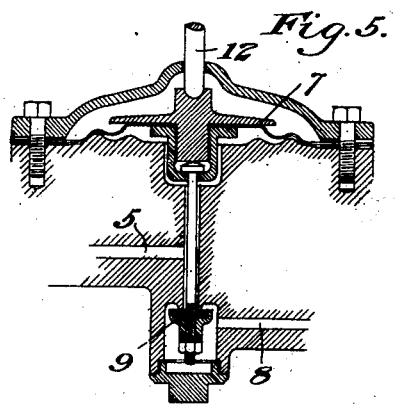
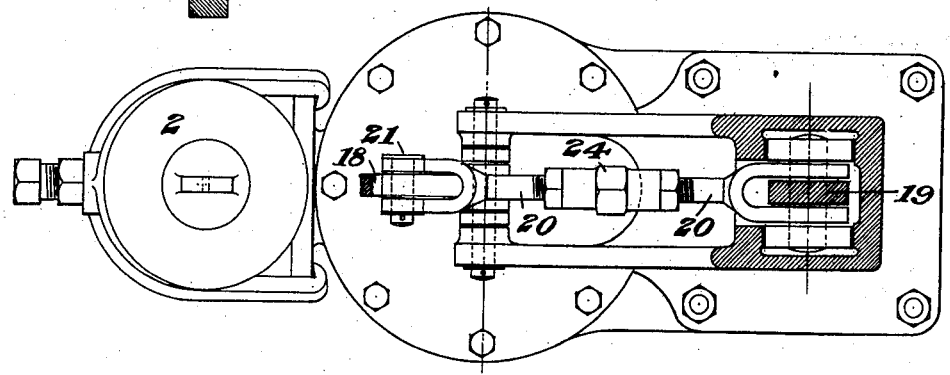
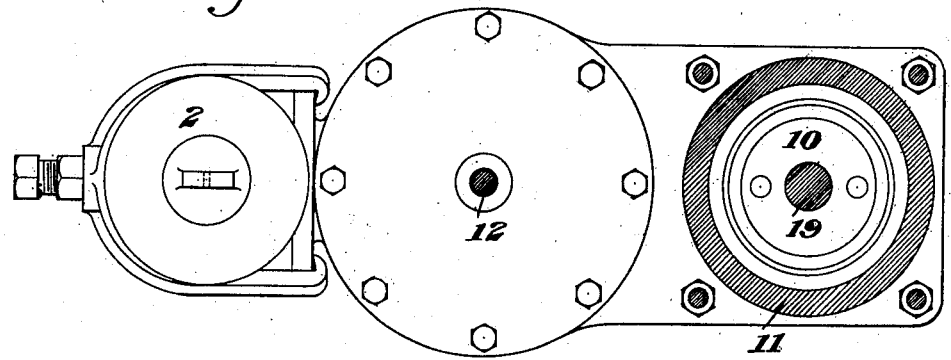
WITNESSES:
A. M. Steen
W. F. Stewart
INVENTOR
John Pressley Coleman
BY
James K. Bakewell
his ATTORNEY

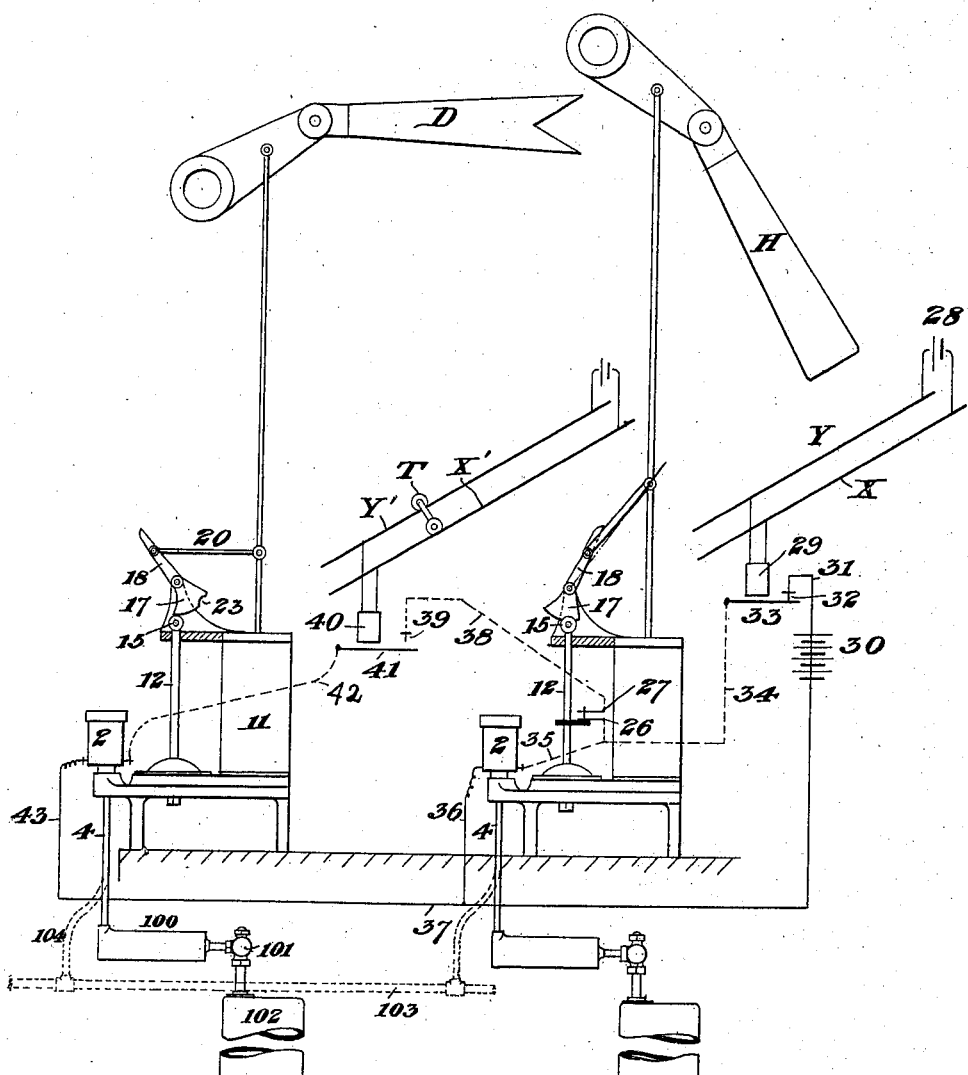

No. 745,307. PATENTED NOV. 24, 1903.
J. P. COLEMAN.
FLUID PRESSURE MECHANISM.
APPLICATION FILED MAY 21, 1902.
NO MODEL. 6 SHEETS—SHEET 5.

WITNESSES
A. M. Steen,
W. F. Stewart

INVENTOR
John Pressley Coleman
by James K. Bakewell
his attorney

No. 745,307. PATENTED NOV. 24, 1903.
J. P. COLEMAN.
FLUID PRESSURE MECHANISM.
APPLICATION FILED MAY 21, 1902.
NO MODEL. 6 SHEETS—SHEET 6.
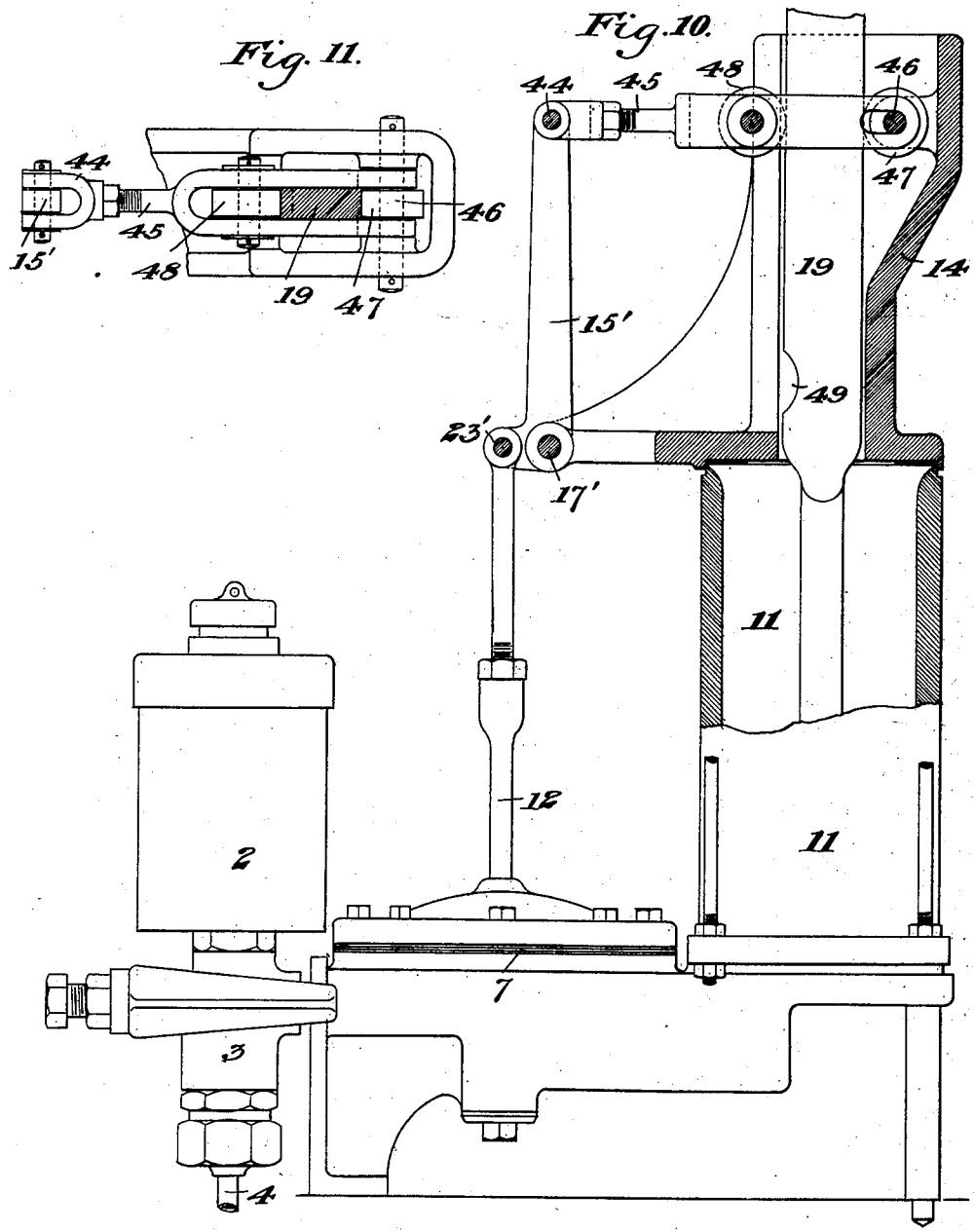
WITNESSES:
A. M. Steen,
W. F. Stewart
INVENTOR
John Pressley Coleman
BY
James K. Bakewell
his ATTORNEY No. 745,307. Patented November 24, 1903.

UNITED STATES PATENT OFFICE.

JOHN PRESSLEY COLEMAN, OF SWISSVALE, PENNSYLVANIA, ASSIGNOR TO THE UNION SWITCH AND SIGNAL COMPANY, OF SWISSVALE, PENNSYLVANIA, A CORPORATION OF PENNSYLVANIA.

FLUID-PRESSURE MECHANISM.

SPECIFICATION forming part of Letters Patent No. 745,307, dated November 24, 1903.

Application filed May 21, 1902. Serial No. 108,317. (No model.)

*To all whom it may concern:*

Be it known that I, JOHN PRESSLEY COLEMAN, of Swissvale, in the county of Allegheny and State of Pennsylvania, have invented certain new and useful Improvements in Fluid-Pressure Mechanism, of which the following is a specification.

My invention relates to fluid-pressure mechanism and to that class of railroad-signals wherein such mechanism is utilized for the operation of the signals and electricity is employed for controlling said mechanism.

I will describe a fluid-pressure mechanism embodying my invention and its application to a railroad-signal, and then point out the novel features thereof in claims.

In the accompanying drawings, Figure 1 is a vertical sectional view of a fluid-pressure mechanism embodying my invention. Fig. 2 shows several members of the mechanism in the position occupied by them after they have been moved to a reversed position. Fig. 3 is an elevation of the mechanism shown in Fig. 1. Fig. 4 is a vertical sectional view of an attachment by means of which an electric current may be controlled by the action of the fluid-pressure mechanism. Fig. 5 is a detail vertical sectional view of the valve by means of which the pressure is cut off from the cylinder after the piston has completed its stroke. Fig. 6 is a plan view, partially in section, on the line A B of Fig. 1. Fig. 7 is a plan view, partially in section, on the line C D of Fig. 1. Fig. 8 is a diagrammatical view of two of my improved devices applied to a railroad signal system. Fig. 9 is a modified form of fluid-pressure mechanism, showing a different arrangement of the valve-stem and connecting parts; and Figs. 10 and 11 show another modification in which there is a different arrangement of locking device.

Like symbols of reference indicate like parts wherever they occur.

In the drawings, 2 is an electromagnet adapted to operate a double valve 3 in the manner ordinarily employed in this type of fluid-pressure mechanism, so that when the magnet 2 is energized the valve 3 is operated to close connection with the atmosphere and to admit fluid-pressure from a supply-inlet 4 to a port or passage 5, through which it passes to a port or passage 8 and under a diaphragm 7 and also through an extension of the passage 8 past an open valve 9, which is secured to a rod 6, extending from or connected with the diaphragm 7, and thus passes to the under side of a piston 10 in a cylinder 11, the piston and cylinder constituting a motor. The effect of the fluid-pressure on the diaphragm 7 (and by "fluid-pressure" I mean either a gas or liquid under pressure) is to produce an upward thrust upon a rod or lever 12, which rests upon a seat at the center of the diaphragm 7. This rod 12, as shown in Fig. 1, is guided by a pin 13, so as to prevent lateral movement, which pin is secured in a frame 14. The rod 12 carries a roller 15, mounted upon a pin 16, which is secured to the rod, the upper end of this rod being slotted to receive the pin 13 and forked to permit of a cam 17 oscillating within the same over the roller 15 of the pin 16. The cam 17 is mounted on pin 13 as a pivot. In this position of the parts the cam 17, resting on the roller 15, acts as a lock and prevents the rod 12 from being elevated by the fluid-pressure exerted against the lower face of the diaphragm 7. Extending from the cam 17 is an arm 18, which is connected with a piston-rod 19 by means of a link 20, which is pivotally connected to the arm 18 by a pin 21. The piston-rod 19 is also connected with a signal at 22.

102 is a reservoir, one being provided for each signal, in which carbonic-acid gas or other fluid is periodically generated or compressed to a much higher pressure than that employed in the fluid-pressure mechanism.

101 is a reducing-valve, which is provided between the reservoir 102 and the fluid-pressure mechanism, whereby the high or artificial pressure of the fluid in the reservoir may be lowered by expansion through such a valve.

100 is an auxiliary reservoir provided between the reducing-valve and the fluid-pressure mechanism. The purpose of this reservoir is to raise the temperature of the fluid after its passage through the reducing-valve, for the higher the temperature the greater the energy in a given volume of fluid. This auxiliary reservoir 100 while shown as being cylindrical in form may be to advantage constructed of coiled pipes or of any other well-known construction which secures large radiating-surface. It is preferable that the reservoir also be of such a capacity that it will contain a volume of fluid considerably greater than that expended in producing one complete operation of the fluid-pressure mechanism. When so constructed, greater time is given the fluid after expansion through the reducing-valve in which to expand under the influence of natural or artificial temperature to which the radiating-surface of the auxiliary reservoir is exposed.

Instead of independent or individual sources of energy being provided for each fluid-pressure mechanism a main source of energy may be employed, from which a pipe-line extends, and from which pipe-line branches extend to the several fluid-pressure mechanisms. This arrangement is shown in dotted lines, Fig. 8.

When the fluid-pressure under the piston 10 acts to elevate the piston-rod 19, the signal is operated and at the same time the arm 18 of the cam 17 is so moved as to bring a notch 23, which is formed in the face of the cam, over the roller 15, carried by the diaphragm-rod 12, thus permitting this rod to move upwardly under the pressure exerted on the diaphragm 7 and to engage the roller, whereby the roller enters the notch and engages with the same, locking the cam in this position, and at the same time, owing to the upward movement of the diaphragm 7 and the rod 6, the valve 9 is closed, shutting off the fluid-pressure from the port 8 and the cylinder 11, but allowing fluid-pressure to continue to be exerted upon the lower face of the diaphragm 7, which causes the continuance of the roller 15 within the notch 23, thus keeping the cam locked and also keeping the signal locked as the piston-rod 19 is held in its elevated position by means of the link 20, as is shown in Fig. 2. By means of adjusting-screws 24 in the link 20 and 25 in the rod 12 the movement of these rods in relation to the cam may be adjusted. In constructing these parts it is preferable that a bell-crank lever, formed by the arm 18 and the link 20, should be so arranged that on the upward movement of the piston-rod 19 the arms of the lever may be thrown as nearly as possible into coincidence with a straight line extending from the two outer pivotal points without impairing the freedom of these parts to move to normal under action of the signal's weight thereon. The object of this is to maintain a perfect mechanical lock with a small-sized diaphragm and the employment of a relatively low degree of pressure on the lower side of the diaphragm 7. The diaphragm and the pressure on one side also constitute what may be termed a "fluid-pressure lock" for the mechanical lock for the signal.

When the magnet 2 is deënergized, the main supply of fluid-pressure is cut off and the fluid-pressure under the diaphragm escapes to the atmosphere through the port 5 and past the valve 3. The diaphragm 7 will then fall and assume its normal position. The fall of the diaphragm is insured by the weight of the signal and connected parts, which act on the diaphragm through the cam 17 and the parts connecting the cam with the piston-rod. The falling of the diaphragm opens the valve 9 and allows any fluid-pressure remaining under the piston to escape past the valve 9 into the port 5 and from there past the valve 3 to the atmosphere. In practice after the valve 9 has been closed against the supply of fluid-pressure to the piston some or all of the fluid-pressure escapes from the cylinder past the packing of the piston. Should, however, none of the fluid-pressure escape from the cylinder, the weight of the signal and connected parts will be sufficient to move the diaphragm when the supply of fluid-pressure is cut off from the diaphragm. This is true owing to the relative small area of the valve 9 on which the fluid-pressure acts. Owing to the large capacity of the cylinder as compared with the size of the passages and ports through which the fluid is expelled the pressure in the cylinder acts as a cushion or dash-pot and absorbs the shock due thereto, and this is true whether the fluid within the cylinder be above or at atmospheric pressure. In Fig. 5 I have shown the diaphragm in the position it occupies when the roller 15 engages the notch 23, and it also shows the valve 9 closed against further admission of pressure to the cylinder 11. In Fig. 4 I have shown the rod 12 fitted with an insulated washer 25, adapted to contact with the spring-arms 26 and 27 when the rod 12 is in its elevated position, and as these spring-arms 26 and 27 are connected with a circuit the elevation of the arm 12 closes the circuit, which circuit may be used to display a safety-signal so long as the rod 12 is in its elevated position.

In Fig. 8 I have shown diagrammatically two block-signals H and D of the same line of track fitted with my improved device and controlled in part thereby. In this diagram 28 is a battery feeding through the rails X and Y of one insulated track-section and having a relay 29 operating in the well-known and usual manner. This relay 29 controls the magnet 2 by means of the battery 30 and wire 31, contact 32, armature 33, and wires 34, 35, 36, and 37. From the wire 34 a branch contact passes to the springs 26 and 27, and thence by wire 38 to contact 39 of the relay 40, which is controlled by a similar track-section to that described, but lying between the signals H and D. From this point it passes by means of the armature 41 and wire 42 to the magnet 2 of the signal D of the second insulated track-section, and thence by wires 43 and 37 back to the battery 30. In this manner the magnet 2 of the signal H is energized only when the contact 32 of the relay 29 is closed, and the magnet 2 of the signal D is energized only when the contact-springs 26 and 27 and contact 39 of the relay 40 are closed.

T represents a train on the rails X' and Y' of the second insulated track-section, which shunts the relay 40, and thus holding the contact 39 open the magnet 2 of the signal D is deënergized and the signal assumes a horizontal position. The rails X and Y, however, are not so shunted, and hence the contact 32 of the relay 29 is closed and the magnet 2 of the signal H is energized, thus causing the signal to display the safety-arm, as shown in the drawings. On leaving the rails X' and Y' the train T will permit the contact 39 of relay 40 to close, but since it enters the rails X Y before leaving the rails X' Y' the relay 29 will have been shunted and contact 32 will have been opened, thereby preventing the battery from longer energizing magnet 2 of signal H, preventing it also from again energizing magnet 2 of the signal D while a train covers the rails X Y. As a further precaution against the magnet 2 being energized, the contacts 26 and 27 are opened in the conductors for the circuit controlling signal D by the act of signal H in assuming danger position in response to the deënergization of its magnet 2. When the train leaves the rails X Y, the contact 32 of the relay 29 is again established and signal H thereupon moves to safety, and not until this occurs does the circuit at 26 and 27 become established. Hence the signal D is not cleared until the signal H has first been cleared. In this diagram (shown in Fig. 8) the signal D is assumed to be a distant or repeating signal for the home signal H; but when the signal D is used as a home signal its control by the signal H and the track-circuit X Y is eliminated and its control is effected solely by the relay 40.

It will be clear to those skilled in the art that these circuits may be so arranged as to secure other results, and the one here described is only one of many in connection with which it may be employed. I therefore do not desire to limit the application of my improvement to any specific arrangement of circuits or to any particular construction and arrangement I have shown and described; as, for instance, contacts 26 and 27 of Figs. 4 and 8 may be operated by motion of the signal-rod or the piston-rod 19, if desired, and the parts of the mechanism may be otherwise constructed than as shown in Fig. 1. Thus in Figs. 10 and 11 I show a modified form of mechanism. In the modified form shown in Fig. 9 the magnet 2, valve 3, diaphragm 7 and its rod 12, cylinder 11, and piston-rod 19 are arranged as in the apparatus already described. The rod 12, however, is shown as being in the form of a bell-crank lever 12', which is fulcrumed intermediate the ends of its long arm. The roller 15 is mounted at the angle of the bell-crank lever, and the rod 6, carrying the valve 9, is connected with the outer or free end of the long arm. The operation of this form of mechanism is substantially the same as the form shown at Fig. 1.

In Figs. 10 and 11 I show another modification of my improvement in which the piston-rod is engaged directly by the lock. In this form 49 is a notch or recess formed in the extension of the piston-rod 19 and adapted to be engaged by a roller 48, mounted in a yoke formed in a toggle-lever arm 45, the outer portion of which yoke is pivoted by means of a roller 47, mounted on a pin 46, which passes through a slot in the arms of the yoke and through a bracket in the frame 14. The other arm 15' of this toggle-lever is pivoted to the frame at 17' and is connected by a short arm at 23' with the rod 12, which extends from the diaphragm 7. When the fluid-pressure in the cylinder 11 acts to elevate the piston-rod 19, the signal is operated, and at the same time fluid-pressure under the diaphragm 7, acting through the arm 45, causes the roller 48 to enter the notch 49 and lock the piston-rod. As already described, this upward movement of the diaphragm closes the valve 9 owing to the upward movement of the valve-stem 6, which is not shown in this figure, but is the same as that already described in Fig. 1, and shuts off the fluid-pressure from the cylinder 11, but allows the fluid-pressure to continue to be exerted on the lower face of the diaphragm, and thereby causes the continuance of the roller 48 within the notch 49, thus keeping the piston or signal-operating rod 19 locked in its elevated position. The circuit-controlling devices of Fig. 4 may also be attached to this modification or to the modification shown in Fig. 9, or a like device may be otherwise operated by the connections peculiar to the locking device formed by the rod 12, crank 15', and rod 45.

While I have desired to show, as in Figs. 1 and 5, a form of valve actuated by internal connections from the diaphragm 7, I do not wish to limit myself to such method of operation, since this or other forms of valves may be operated through suitable levers or other members by external connections between it and the movable members of the locking apparatus. Also I do not wish to be limited to a diaphragm *per se* for the operation of the lock, as it is obvious that other apparatus operated by fluid-pressure constituting, in effect, as does the diaphragm, a motor, may be substituted for the diaphragm.

Having thus described my invention, what I claim, and desire to secure by Letters Patent, is—

1. The combination in a railway-signal, of a signal, a motor operable by fluid-pressure and connected with said signal for moving it from one position of indication to another position of indication, a diaphragm also operable by fluid-pressure and having an exhaust, a lock operated by the diaphragm for holding the signal in the position of indication to which it has been moved by the motor, said lock being effective only when the diaphragm is influenced by the fluid-pressure and being released by the weight of the signal in its reverse movement and the opening of the exhaust for the diaphragm, and means for controlling the admission of the fluid-pressure to the motor and diaphragm.

2. The combination in a railway-signal, of a signal, a motor operable by fluid-pressure, a connection between the movable part of the motor and signal whereby on the operation of the motor the signal is moved from one position of indication to another position of indication, means for engaging said connection to hold it after its movement by the motor, a diaphragm also operable by fluid-pressure for controlling the said means and having an exhaust, said means being effective only when the diaphragm is influenced by fluid-pressure and being released by the weight of the signal in its reverse movement and the opening of the exhaust, and means for controlling the supply of fluid-pressure to the motor and diaphragm.

3. In a fluid-pressure mechanism, the combination of a motor operable by fluid-pressure, a diaphragm also operable by fluid-pressure, a lock operated by the diaphragm for retaining the movable part of the motor in an advanced position and effective only when the diaphragm is influenced by fluid-pressure, a valve for admitting fluid-pressure to the motor and to the diaphragm, and a valve operated by the diaphragm for shutting off the supply of fluid-pressure from the motor.

4. In a fluid-pressure mechanism, the combination of a motor operable by fluid-pressure, a diaphragm also operable by fluid-pressure, means operated by the diaphragm for holding the movable part of the motor in an advanced position which means are effective only when the diaphragm is influenced by fluid-pressure, means for controlling the supply of fluid-pressure to the motor and diaphragm, and a valve for shutting off the supply of fluid-pressure to the motor.

5. In a fluid-pressure mechanism, the combination of a motor operable by fluid-pressure, a diaphragm also operable by fluid-pressure, means operated by the diaphragm for holding the movable part of the motor in an advanced position, which means are effective only when the diaphragm is influenced by fluid-pressure, means for controlling the supply of fluid-pressure to the motor and diaphragm, and a valve operated by the diaphragm for controlling the supply of fluid-pressure to the motor.

6. The combination in a railway-signal, of a signal, a motor operable by fluid-pressure connected with the signal for moving it from one position of indication to another, a valve for controlling the supply of fluid-pressure to the motor, and means comprising a diaphragm which has an exhaust, for holding the signal in the position of indication to which it has been moved, which means are effective only when the diaphragm is influenced by fluid-pressure and are released on the opening of the exhaust by the weight of the signal in its reverse movement.

7. The combination in a railway-signal, of a signal, a motor operable by fluid-pressure connected with the signal for moving it from one position of indication to another, an automatically-operated valve for controlling the supply of fluid-pressure to the motor, and means comprising a diaphragm which has an exhaust for holding the signal in the position of indication to which it has been moved, which means are effective only when the diaphragm is influenced by fluid-pressure and are released on the opening of the exhaust by the weight of the signal in its reverse movement.

8. The combination in a railway-signal, of a signal, a fluid-pressure mechanism for moving the signal from one position of indication to another, a lock for holding the signal in the position to which it has been moved, a diaphragm operable by fluid-pressure for actuating said lock, said lock being effective only when the diaphragm is influenced by fluid-pressure, and means under the control of a train for controlling the admission of fluid-pressure to the fluid-pressure mechanism and to the diaphragm.

9. The combination in a railway-signal, of a signal, a fluid-pressure mechanism for moving the signal from one position of indication to another, a lock for holding the signal in the position to which it has been moved, a diaphragm operable by fluid-pressure for actuating the lock, said lock being effective only when the diaphragm is influenced by fluid-pressure, a valve actuated by the diaphragm for controlling the supply of fluid-pressure to the fluid-pressure mechanism after it has been operated to set the signal, and a valve under the control of a train for controlling the supply of fluid-pressure to the fluid-pressure mechanism and to the diaphragm.

10. In a railway-signal, the combination of a signal, a fluid-pressure motor, a suitable connection between the signal and movable part of the motor through which the signal is moved from one position of indication to another, a lock coacting with said connection to prevent the movement thereof in a reverse direction after the motor has been operated, a diaphragm actuated by fluid-pressure, said lock being effective only when the diaphragm is influenced by fluid-pressure, an automatically-operated valve for controlling the supply of fluid-pressure to the motor and diaphragm, and another valve for controlling the supply of fluid-pressure to the motor which valve is operated to shut off the supply of fluid-pressure to the motor.

In testimony whereof I have hereunto set my hand.

JOHN PRESSLEY COLEMAN.

Witnesses:
W. L. McDANIEL,
GEO. E. CRUSE.